US012640507B2

(12) United States Patent
Little

(10) Patent No.: US 12,640,507 B2
(45) Date of Patent: May 26, 2026

(54) ELECTRICAL CONNECTOR ASSEMBLY WITH IMPROVED MATING INTERFACES

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Terrance F. Little, Fullerton, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 330 days.

(21) Appl. No.: 18/242,139

(22) Filed: Sep. 5, 2023

(65) Prior Publication Data

US 2025/0079735 A1 Mar. 6, 2025

(51) Int. Cl.

*H01R 12/71* (2011.01)
*H01R 13/426* (2006.01)
*H01R 13/6585* (2011.01)

(52) U.S. Cl.

CPC ......... *H01R 12/716* (2013.01); *H01R 13/426* (2013.01); *H01R 13/6585* (2013.01)

(58) Field of Classification Search

CPC .... H01R 12/716; H01R 13/02; H01R 13/426; H01R 13/6585; H01R 13/6586; H01R 24/60

USPC .................................... 439/77, 78, 81, 607.1

See application file for complete search history.

(56) References Cited

U.S. PATENT DOCUMENTS 4,035,047 A * 7/1977 Ammon ................. H01R 13/42 439/943
4,881,904 A * 11/1989 Ammon ............... H01R 13/514 439/712
5,057,028 A * 10/1991 Lemke ............... H01R 13/6585 439/108
5,174,764 A * 12/1992 Kandybowski ........ H01R 12/00 439/876
5,199,880 A * 4/1993 Arai ..................... H01R 12/716 439/78
5,474,472 A * 12/1995 Niwa ................. H01R 13/6585 439/108

(Continued)

FOREIGN PATENT DOCUMENTS

CN 215299556 U 12/2021
CN 218123778 U 12/2022

*Primary Examiner* — Tulsidas C Patel
*Assistant Examiner* — Thomas K Quigley
(74) *Attorney, Agent, or Firm* — Ming Chieh Chang

(57) ABSTRACT

An electrical connector assembly includes: a board connector defining a mating cavity and two mating tongues parallel to each other and protruding into the mating cavity, each mating tongue being loaded with two rows of stationary terminals along two opposite sides thereof; and a cable connector defining a mating portion and plural cables, the mating portion defining two mating slots, each mating slot being loaded with two rows of elastic terminals along two opposite sides thereof, wherein the mating portion is inserted into the mating cavity, the mating slots receive corresponding mating tongues, and the stationary terminals and the elastic terminals are electrically and mechanically connected with each other.

12 Claims, 14 Drawing Sheets

(56) References Cited

U.S. PATENT DOCUMENTS

| | | | | | |
|---|---|---|---|---|---|
| 5,542,851 | A * | 8/1996 | Chikano | H01R 13/6582 | 439/607.05 |
| 5,618,191 | A * | 4/1997 | Chikano | H01R 12/716 | 439/108 |
| 5,697,799 | A * | 12/1997 | Consoli | H01R 12/73 | 439/910 |
| 5,795,194 | A * | 8/1998 | Hahn | H01R 12/721 | 29/874 |
| 5,816,829 | A * | 10/1998 | Chiang | H01R 43/205 | 439/76.1 |
| 5,876,217 | A * | 3/1999 | Ito | H01R 13/20 | 439/74 |
| 5,885,092 | A * | 3/1999 | Ito | H01R 12/716 | 439/74 |
| 5,904,581 | A * | 5/1999 | Pope | H01R 24/60 | 439/74 |
| 5,919,063 | A * | 7/1999 | Wang | H01R 13/658 | 439/83 |
| 6,074,225 | A * | 6/2000 | Wu | H01R 13/6582 | 439/939 |
| 6,093,031 | A * | 7/2000 | Longueville | H01R 12/716 | 439/78 |
| 6,152,747 | A * | 11/2000 | McNamara | H01R 13/6587 | 439/607.07 |
| 6,210,240 | B1 * | 4/2001 | Comerci | H01R 12/7088 | 439/853 |
| 6,302,711 | B1 * | 10/2001 | Ito | H01R 4/028 | 439/83 |
| 6,338,635 | B1 * | 1/2002 | Lee | H01R 13/6585 | 439/607.11 |
| 6,655,992 | B1 * | 12/2003 | Ko | H01R 12/598 | 439/497 |
| 6,663,402 | B1 * | 12/2003 | Yu | H01R 13/6582 | 439/108 |
| 6,672,887 | B1 * | 1/2004 | Yu | H01R 13/6582 | 439/108 |
| 6,971,915 | B1 * | 12/2005 | Mao | H01R 13/6485 | 439/607.37 |
| 7,086,872 | B2 * | 8/2006 | Myer | H01R 12/724 | 439/876 |
| 7,086,913 | B2 * | 8/2006 | Myer | H01R 12/7005 | 439/876 |
| 7,134,888 | B2 * | 11/2006 | Fan | H01R 13/4538 | 439/140 |
| 7,150,645 | B2 * | 12/2006 | Huang | H01R 13/4538 | 439/378 |
| 7,179,127 | B2 * | 2/2007 | Shiu | H01R 13/6589 | 439/607.05 |
| 7,442,056 | B1 * | 10/2008 | Ju | H01R 27/00 | 439/79 |
| 7,503,773 | B2 * | 3/2009 | Tokunaga | H01R 13/6585 | 439/74 |
| 7,766,674 | B1 * | 8/2010 | Mao | H01R 13/502 | 439/82 |
| 7,794,238 | B2 * | 9/2010 | Chen | H01R 12/716 | 439/74 |
| 8,602,812 | B2 * | 12/2013 | Ohsaka | H01R 13/6581 | 439/497 |
| 8,905,788 | B2 * | 12/2014 | Oniyama | H01R 12/716 | 439/626 |
| 9,112,302 | B2 * | 8/2015 | Liao | H01R 12/777 | |
| 9,780,517 | B2 * | 10/2017 | Zerebilov | H01R 43/26 | |
| 10,109,937 | B2 * | 10/2018 | Zerebilov | H01R 13/567 | |
| 10,404,014 | B2 * | 9/2019 | Huang | H01R 13/6477 | |
| 10,559,929 | B2 * | 2/2020 | Pickel | H01R 13/6471 | |
| 10,581,189 | B2 * | 3/2020 | Qiao | H01R 12/75 | |
| 10,673,182 | B2 * | 6/2020 | Ellison | H01R 13/567 | |
| 11,146,025 | B2 * | 10/2021 | Lu | H01R 13/6581 | |
| 11,171,453 | B2 * | 11/2021 | Chen | H01R 13/6586 | |
| 11,245,229 | B2 * | 2/2022 | Ellison | H01R 9/2483 | |
| 11,411,355 | B2 * | 8/2022 | Lv | H01R 13/506 | |
| 11,431,131 | B2 * | 8/2022 | Lv | H01R 13/6582 | |
| 11,469,530 | B2 * | 10/2022 | Guo | H01R 13/512 | |
| 11,469,554 | B2 * | 10/2022 | Ellison | H01R 13/6471 | |
| 11,495,909 | B2 * | 11/2022 | Laurx | H01R 13/405 | |
| 11,575,231 | B2 * | 2/2023 | Lv | H01R 13/502 | |
| 11,695,228 | B2 * | 7/2023 | Tanaka | H01R 12/716 | 439/78 |
| 11,728,585 | B2 * | 8/2023 | Lu | H01R 12/75 | 439/676 |
| 12,218,451 | B2 * | 2/2025 | Mamuro | H01R 13/6581 | |
| 12,218,464 | B2 * | 2/2025 | Nakamura | H01R 13/24 | |
| 12,294,187 | B2 * | 5/2025 | Liu | H01R 24/60 | |
| 2003/0232538 | A1 * | 12/2003 | Huang | H01R 12/7011 | 439/607.53 |
| 2004/0115993 | A1 * | 6/2004 | Lai | H01R 12/716 | 439/660 |
| 2004/0259420 | A1 * | 12/2004 | Wu | H01R 13/6589 | 439/607.05 |
| 2006/0003615 | A1 * | 1/2006 | Huang | H01R 13/4538 | 439/137 |
| 2006/0014432 | A1 * | 1/2006 | Mao | H01R 12/7035 | 439/607.01 |
| 2006/0063407 | A1 * | 3/2006 | Fan | H01R 13/4538 | 439/137 |
| 2006/0141866 | A1 * | 6/2006 | Shiu | H01R 13/6589 | 439/607.35 |
| 2006/0258230 | A1 * | 11/2006 | Pan | H01R 13/514 | 439/790 |
| 2007/0173119 | A1 * | 7/2007 | Xiao | H01R 13/658 | 439/607.2 |
| 2009/0186497 | A1 * | 7/2009 | Mao | H01R 12/00 | 439/74 |
| 2009/0221165 | A1 | 9/2009 | Buck | | |
| 2009/0269987 | A1 * | 10/2009 | Chen | H01R 13/20 | 439/656 |
| 2010/0167569 | A1 | 7/2010 | Stoner | | |
| 2011/0028040 | A1 * | 2/2011 | Wu | H01R 12/57 | 439/626 |
| 2011/0086546 | A1 * | 4/2011 | Mao | H01R 12/7052 | 439/607.4 |
| 2011/0143555 | A1 * | 6/2011 | Pan | H01R 13/5213 | 439/38 |
| 2012/0088410 | A1 * | 4/2012 | Oniyama | H01R 13/6473 | 439/626 |
| 2012/0302096 | A1 * | 11/2012 | Ellison | H01R 13/6466 | 439/607.05 |
| 2013/0273781 | A1 * | 10/2013 | Buck | H01R 13/6585 | 439/626 |
| 2014/0193992 | A1 * | 7/2014 | Fang | H01R 13/6594 | 439/345 |
| 2014/0322962 | A1 * | 10/2014 | Chen | H01R 12/716 | 29/842 |
| 2014/0329415 | A1 * | 11/2014 | Liao | H01R 12/777 | 439/660 |
| 2015/0072559 | A1 * | 3/2015 | Qian | H01R 13/6582 | 439/607.17 |
| 2016/0079720 | A1 * | 3/2016 | Zhong | H01R 24/66 | 439/660 |
| 2016/0268739 | A1 * | 9/2016 | Zerebilov | H01R 4/66 | |
| 2018/0026400 | A1 * | 1/2018 | Morgan | H01R 12/58 | 439/78 |
| 2018/0175561 | A1 * | 6/2018 | Chen | H01R 12/52 | |
| 2018/0183191 | A1 * | 6/2018 | Endo | H01R 9/0518 | |
| 2018/0198220 | A1 | 7/2018 | Sasame et al. | | |
| 2018/0366880 | A1 * | 12/2018 | Zerebilov | H01R 13/502 | |
| 2019/0089097 | A1 | 3/2019 | Cho et al. | | |
| 2020/0083627 | A1 | 3/2020 | Peloza et al. | | |
| 2021/0006017 | A1 * | 1/2021 | Chen | H01R 13/6586 | |
| 2021/0075143 | A1 | 3/2021 | Laurx et al. | | |
| 2021/0126404 | A1 | 4/2021 | Laurx et al. | | |
| 2021/0218197 | A1 * | 7/2021 | Lv | H01R 13/6582 | |
| 2021/0305740 | A1 * | 9/2021 | Mongold | H01R 12/79 | |
| 2021/0313721 | A1 * | 10/2021 | Little | H01R 13/6272 | |
| 2021/0320461 | A1 * | 10/2021 | Buck | H01R 12/7082 | |
| 2021/0367381 | A1 * | 11/2021 | Lv | H01R 13/6582 | |
| 2021/0399451 | A1 * | 12/2021 | Lu | H01R 43/20 | |
| 2022/0231443 | A1 * | 7/2022 | Mamuro | H01R 13/424 | |
| 2022/0336999 | A1 * | 10/2022 | Lu | H01R 12/716 | |

(56) References Cited

U.S. PATENT DOCUMENTS

| | | | | |
|---|---|---|---|---|
| 2022/0385004 | A1* | 12/2022 | Nakamura | H01R 12/716 |
| 2023/0047149 | A1* | 2/2023 | Laurx | H01R 13/6471 |
| 2023/0100671 | A1* | 3/2023 | Daily | H01R 13/24<br>439/65 |
| 2023/0128860 | A1* | 4/2023 | Liu | H01R 12/75<br>439/607.05 |
| 2023/0261397 | A1* | 8/2023 | Okubo | H01R 12/73<br>439/78 |
| 2023/0261401 | A1* | 8/2023 | Yayoshi | H01R 13/50<br>439/78 |
| 2023/0283027 | A1* | 9/2023 | Hwang | H01R 13/639<br>439/660 |
| 2024/0030658 | A1* | 1/2024 | Little | H01R 13/6594 |
| 2024/0128669 | A1* | 4/2024 | Lim | H01R 12/75 |
| 2025/0015542 | A1* | 1/2025 | Zeng | H01R 13/635 |
| 2025/0023299 | A1* | 1/2025 | Cheng | H01R 12/75 |
| 2025/0030203 | A1* | 1/2025 | Chen | H01R 24/60 |

* cited by examiner

ELECTRICAL CONNECTOR ASSEMBLY WITH IMPROVED MATING INTERFACES

BACKGROUND OF THE INVENTION

1. Field of the Invention

The present invention relates to an electrical connector assembly including a board connector and a cable connector mating with each other.

2. Description of Related Arts

Electrical connectors, which feature a tongue in receptacle design where non-cantilever beam tongue is adopted in order to reduce overall mating height, are disclosed in U.S. patent application Ser. No. 18/220,427 and application Ser. No. 18/115,906.

An improved electrical connector assembly is desired.

SUMMARY OF THE INVENTION

An object of the present invention is to provide an electrical connector assembly with improved mating interfaces.

To achieve the above-mentioned object, an electrical connector assembly comprises: a board connector defining a mating cavity and two mating tongues parallel to each other and protruding into the mating cavity, each mating tongue being loaded with two rows of stationary terminals along two opposite sides thereof; and a cable connector defining a mating portion and a plurality of cables, the mating portion defining two mating slots, each mating slot being loaded with two rows of elastic terminals along two opposite sides thereof, wherein the mating portion is inserted into the mating cavity, the mating slots receive corresponding mating tongues, and the stationary terminals and the elastic terminals are electrically and mechanically connected with each other.

Other advantages and novel features of the invention will become more apparent from the following detailed description of the present embodiment when taken in conjunction with the accompanying drawings.

Figure 1:
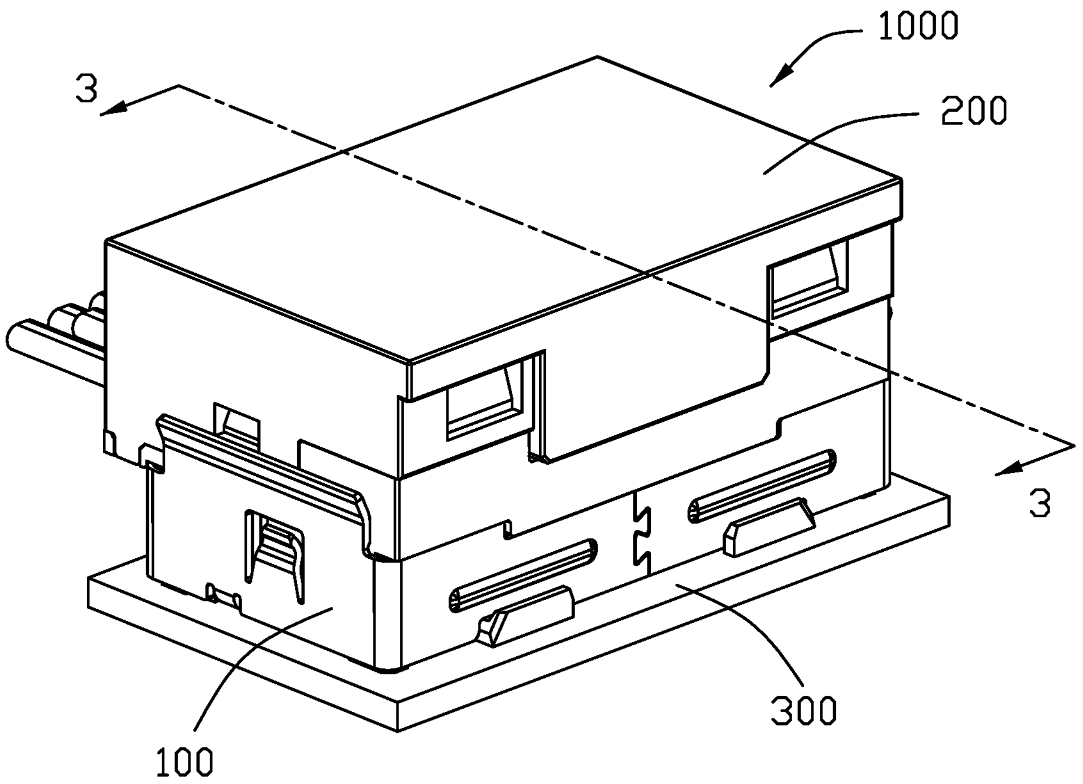
FIG. 1 is a front and top perspective view of an electrical connector assembly including a board connector mounted on a PCB and mated with a cable connector, in accordance with the present invention.
Figure 2:
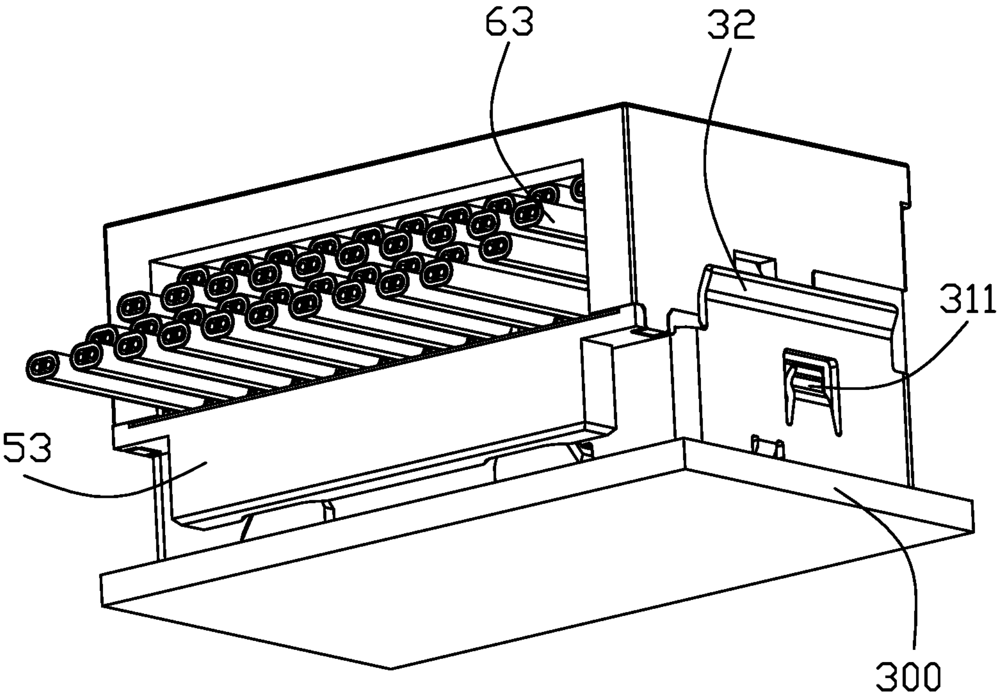
FIG. 2 is a rear and bottom perspective view of the electrical connector assembly.
Figure 3:
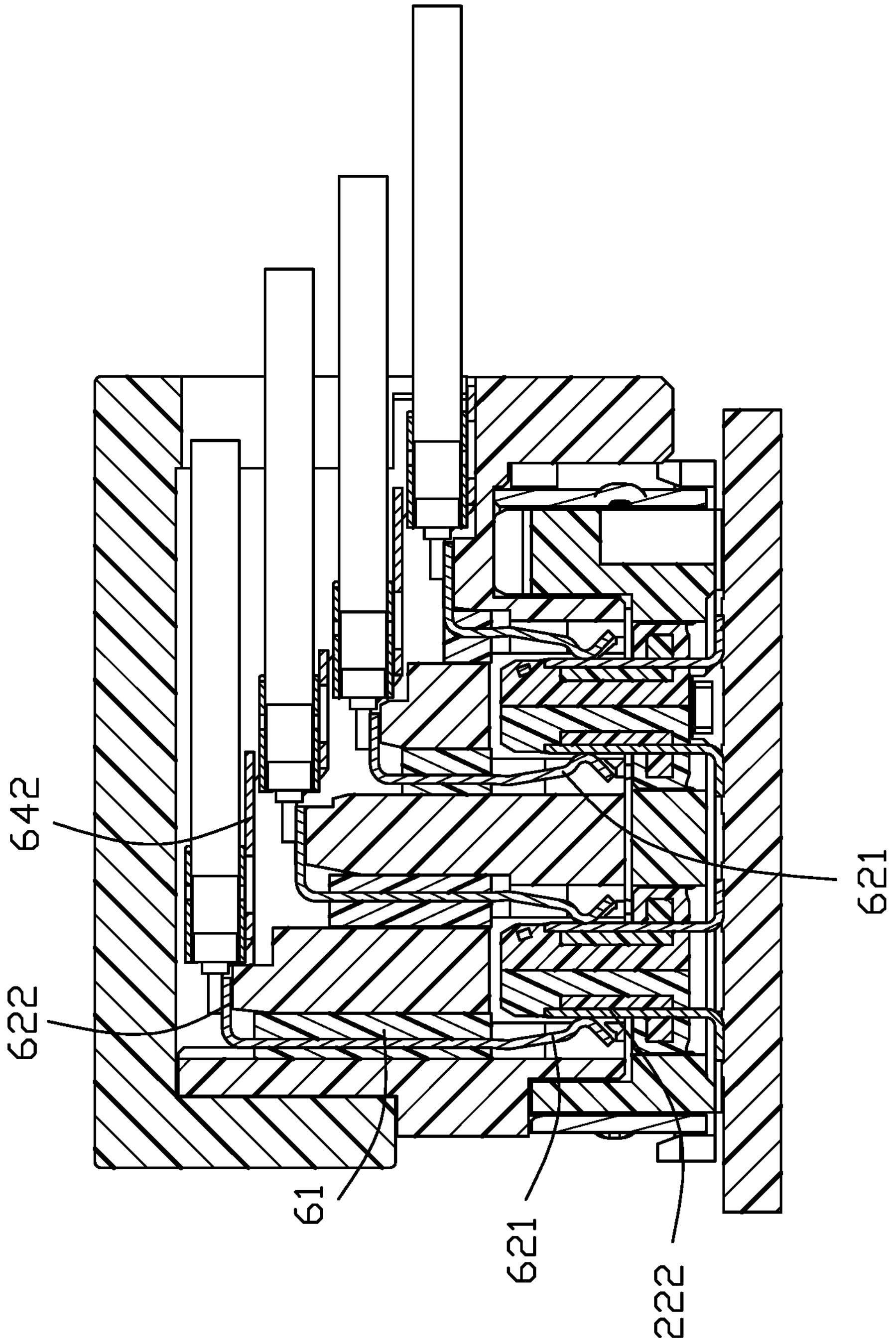
FIG. 3 is a cross-sectional view of the electrical connector assembly taken along lines 3-3 in FIG. 1.
Figure 4:
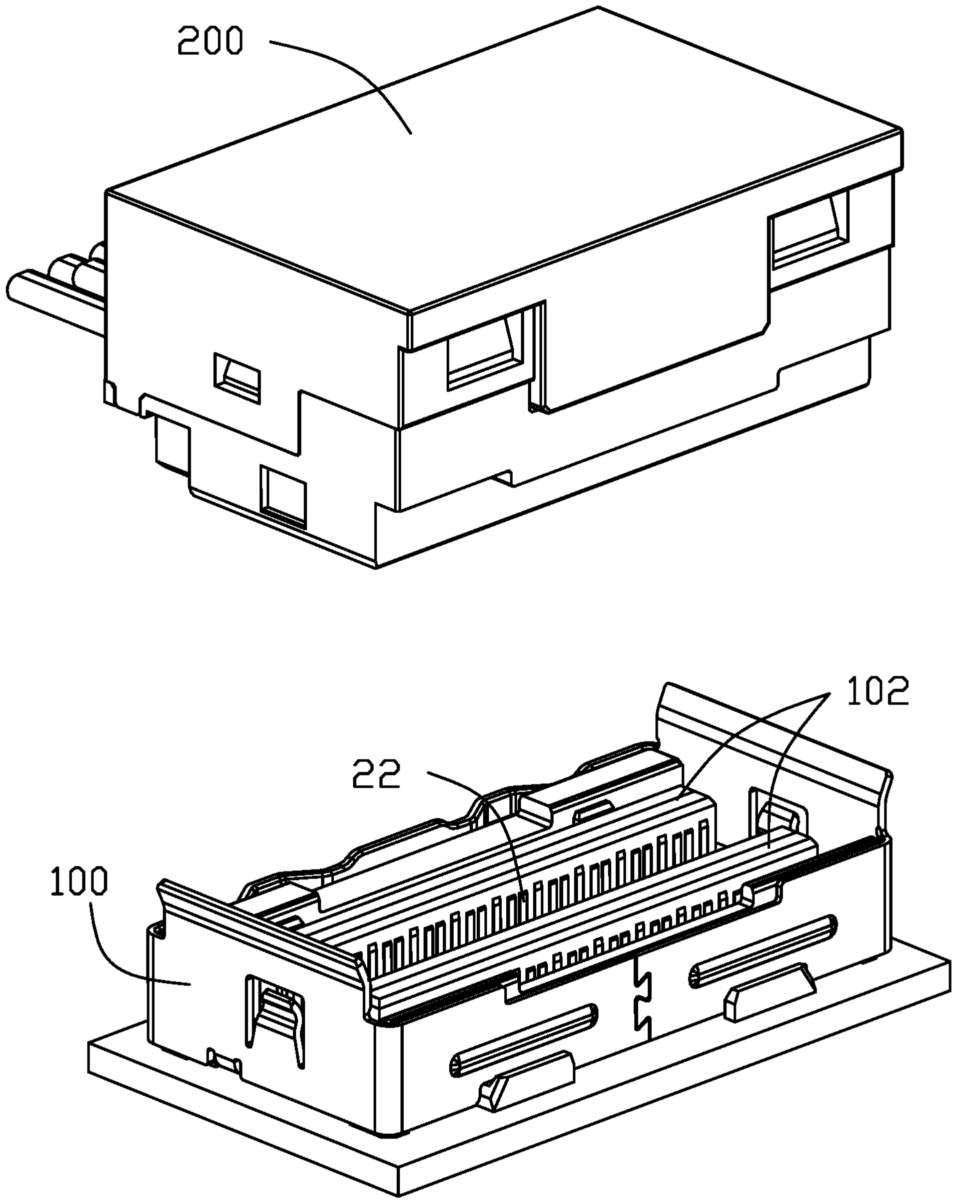
FIG. 4 is a perspective view of the electrical connector assembly under a condition that the cable connector is disconnected from the board connector.

Other advantages and novel features of the invention will become more apparent from the following detailed description of the present embodiment when taken in conjunction with the accompanying drawings.

DETAILED DESCRIPTION OF THE PREFERRED EMBODIMENT

Reference will now be made to the drawing figures to describe the preferred embodiment of the present invention in detail.

Figure 5:
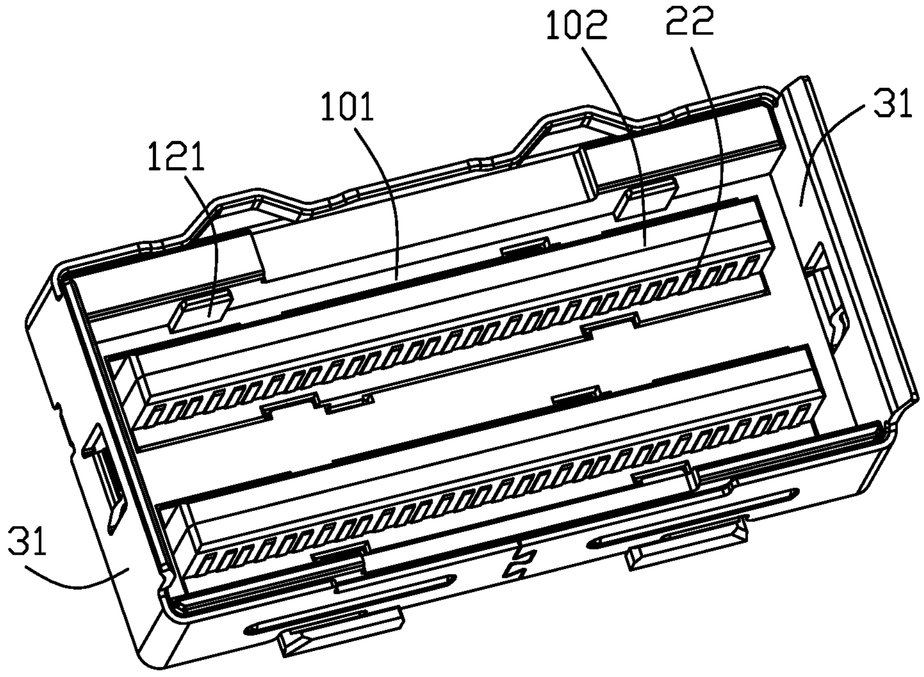
FIG. 5 is a perspective view of the board connector.

Referring to FIGS. 1-4, an electrical connector assembly 100 is illustrated, which includes a board connector 100 adapted for being mounting on a printed circuit board 300 and a cable connector 200 connecting with a plurality of cables 63, mated with each other. The electrical connector 100 defines a rectangular mating cavity 101 as best shown in FIG. 5 and two mating tongues 102 protruding into the mating cavity 101, each of the mating tongues 102 is loaded with two rows of stationary terminals 22 on two opposite surfaces thereof. Combination with FIG. 11, the cable connector 200 defines two parallel mating slots 52 in a longitudinal shape, each of the mating slot 52 is loaded with two rows of elastic terminals 62 along two opposite sides thereof. The cable connector 200 is inserted into the board connector 100 so that the mating slots 52 receive the mating tongues 20 to get electric connection between the two electrical connectors.

Figure 6:
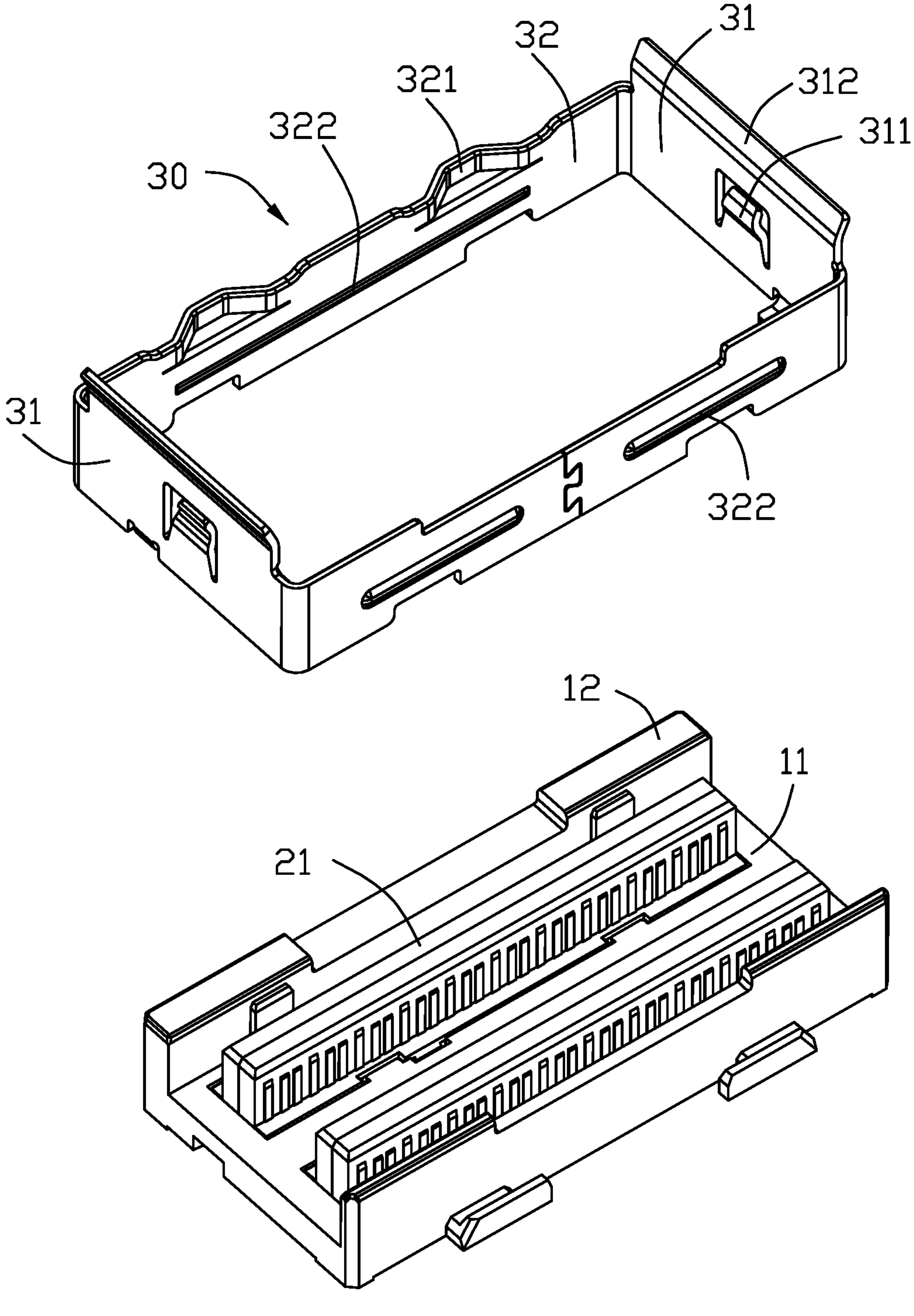
FIG. 6 is an exploded perspective view of the board connector.
Figure 7:
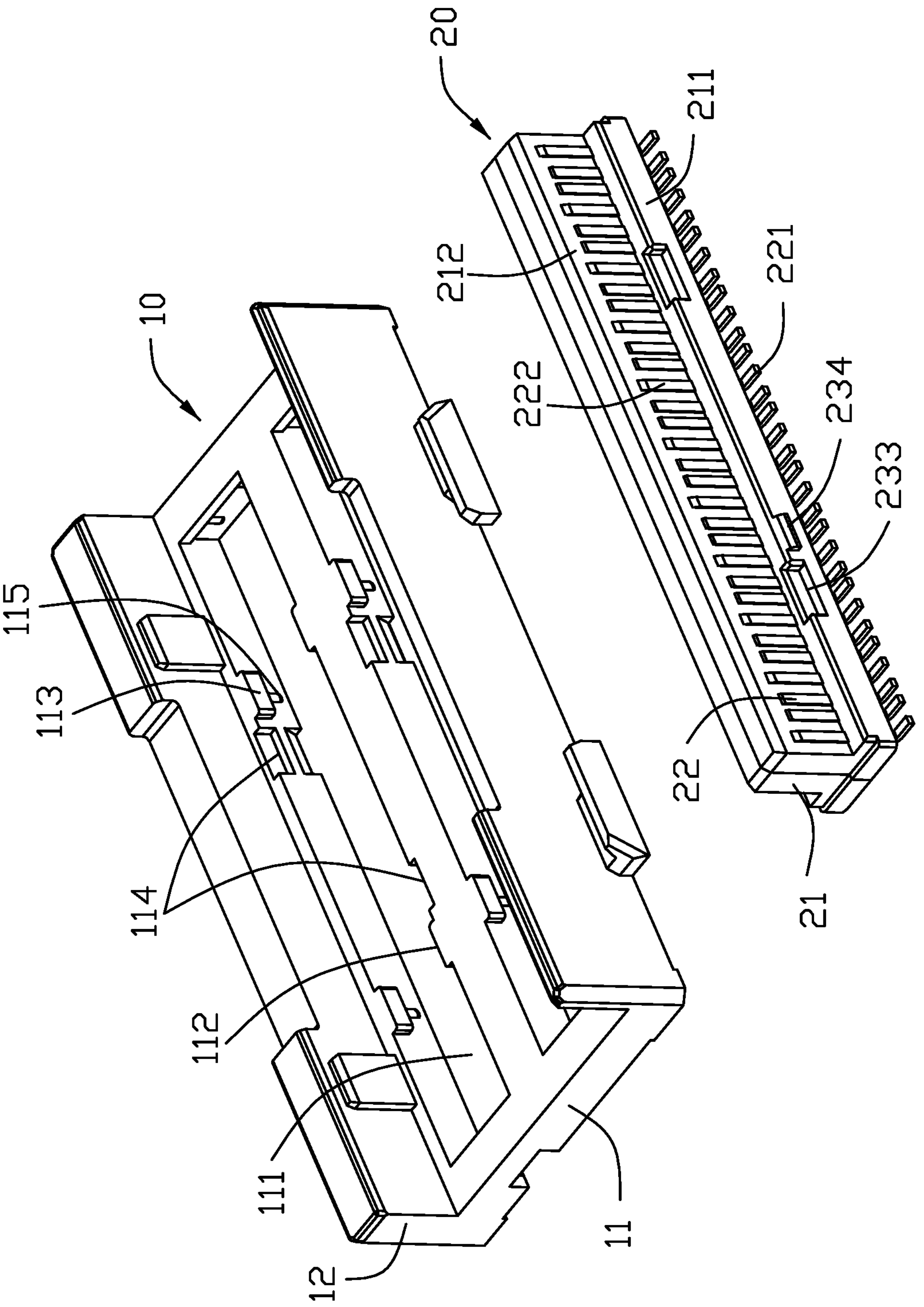
FIG. 7 is a further exploded perspective view of the board connector in FIG. 6, wherein one terminal module is moved to FIG. 8.

Referring to FIGS. 5-7, the board connector 100 includes an insulating housing 10, two terminal modules 20 and a metal shell 30. The insulating housing 10 defines a bottom 11 and two long walls 12 unitarily extending upwards from the bottom 11. The shielding shell 30 includes four side plates having two short plates 31 and two long plates 32. The four side plates fitly surround the insulating housing 10 at an outer side of the housing, the mating cavity 101 is defined among the two long walls 12 and the two short plates 31 of the shielding shell 30 as best shown FIG. 5.

Each of the terminal modules 20 includes an insulator 21 and two rows of stationary terminals 22 injecting molded with the insulator 21. The insulator 21 includes a base 211 and a tongue 212 extending upwards from the base 211. The stationary terminals 22 includes plate portions 222 exposed upon two opposite surfaces of the tongue 212 to be contacting portions, and leg portions 221 extending outwards the base 211 to be soldered with the PCB 300. The two terminal modules 20 are inserted into the housing 10 through in two retained slots 111 defined on the bottom 11 of the insulating housing 10, wherein the bases 211 are retained in the retained slots 111 and the tongues 212 protrude in the mating cavity 101 so as to be the mating tongues 102. As best shown in FIG. 7, the insulating housing 10 defines stopping bosses 113, interference tabs 115 and locking recesses 114 along the insides of the retained slots 111, the insulator 21 defines corresponding stopping recesses 233 and locking bosses 234, which match with each other and retain the insulators 21 in the insulating housing 10.

Figure 8:
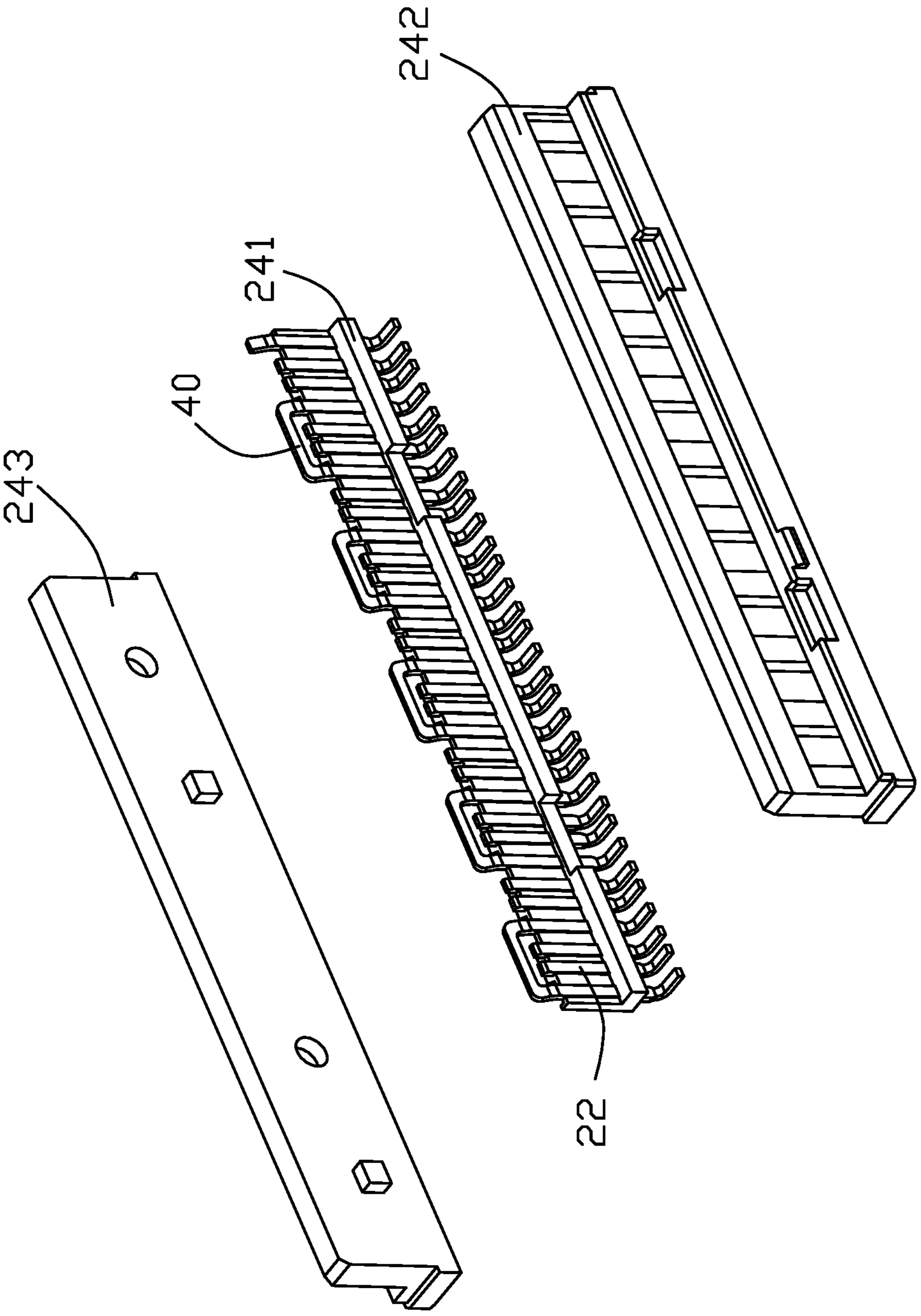
FIG. 8 is a further exploded perspective view of the terminal module.

In this embodiment, as best shown in FIG. 8, each row of terminals 22 are injecting molded with a first insulating wall 241 for preliminarily positioning and then a second insulating wall 242 is injecting molded with the first insulating wall 241 with the row of terminals 22 to get a half assembly 243. Two half assembly 243 are assembled together to form the terminal module 20. The single grounding bars 40 are exposed to an outer exterior of the first insulating wall 241.

Figure 9:
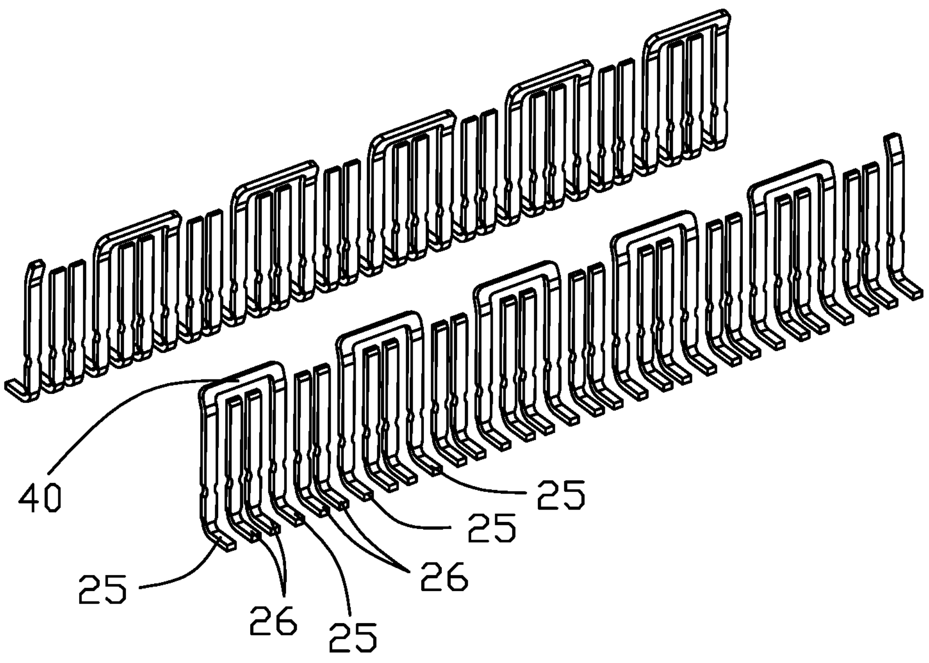
FIG. 9 is a perspective view of two rows of terminals in FIG. 8.

Referring to FIG. 9, each row of terminals 22 includes a plurality of grounding terminals 25 and a plurality of signal terminals 26, two adjacent signal terminals 26 are constructed as a pair of differential signal terminals, the pair of differential signal terminals are located between two grounding terminals 25, two pairs of differential signal terminals is separated by one grounding terminals 25. Every two adjacent grounding terminals 25 are bridged with a single grounding bar 40 and constructed as a coupling grounding pair, while every adjacent couple grounding pair are separated from each other with no single grounding bar connecting with each other. That means, two adjacent single grounding bars 40 are separated from each other by one pair of differential signal terminals, thereby destroying a resonance condition of the grounding terminals and suppressing corresponding ground resonance, which is fully described in U.S. Provisional application No. 63/380,383.

Figure 10:
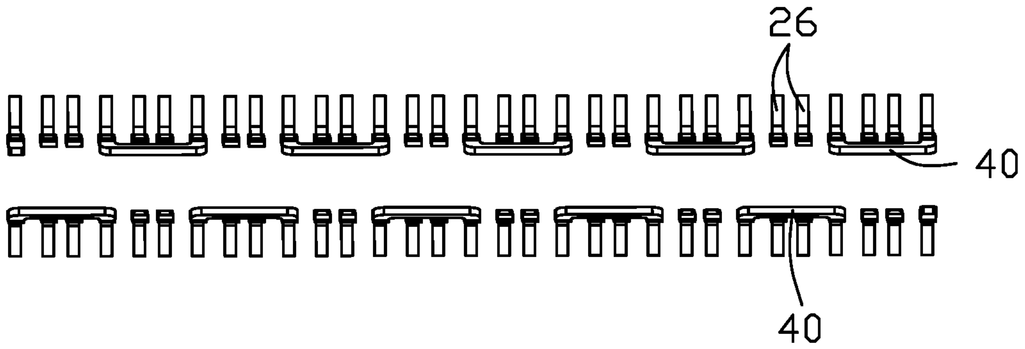
FIG. 10 is an another perspective view of two rows of terminals in FIG. 9.

Referring to FIG. 10, the single grounding bars 40 of one row of terminals face one pair of differential signal terminals 26.

Figure 11:
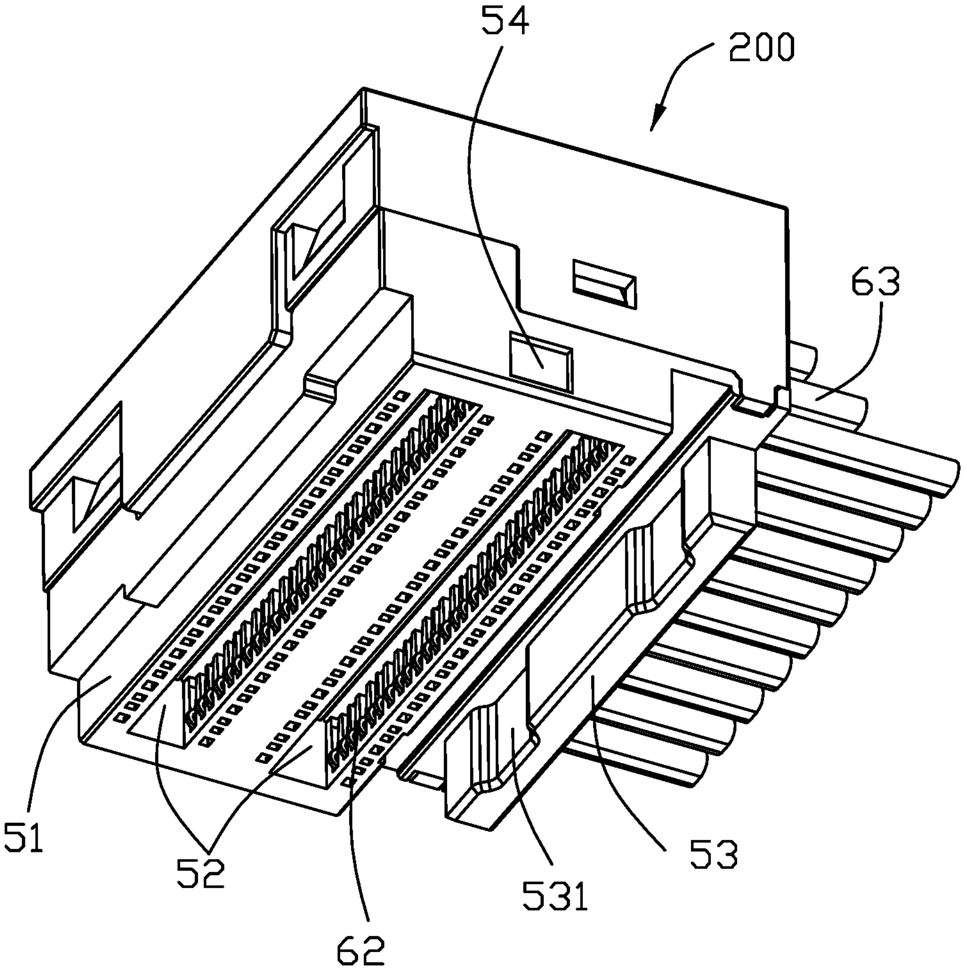
FIG. 11 is another perspective view of the cable connector in FIG. 4.
Figure 12:
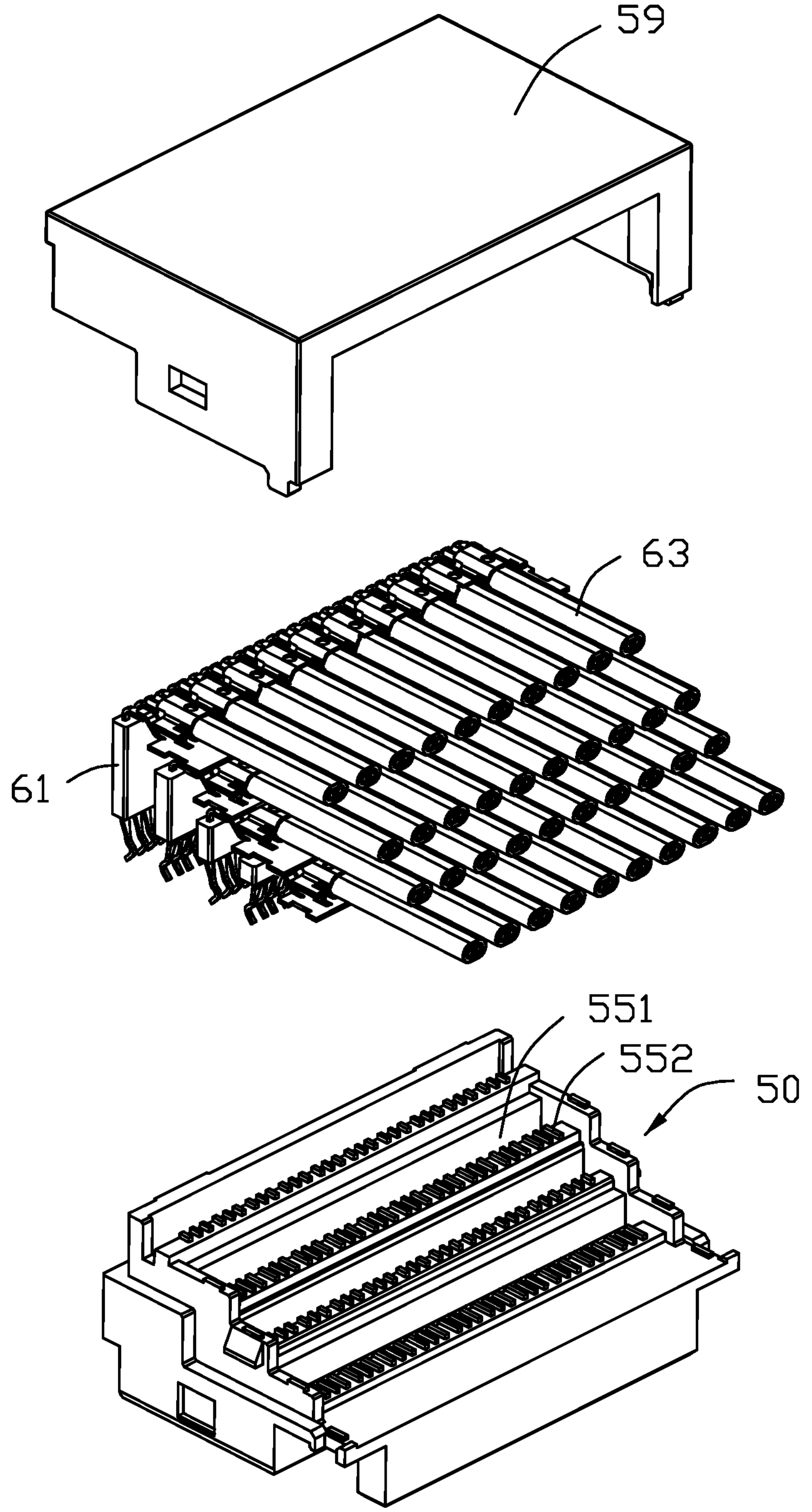
FIG. 12 is an exploded perspective view of the cable connector in FIG. 11.
Figure 13:
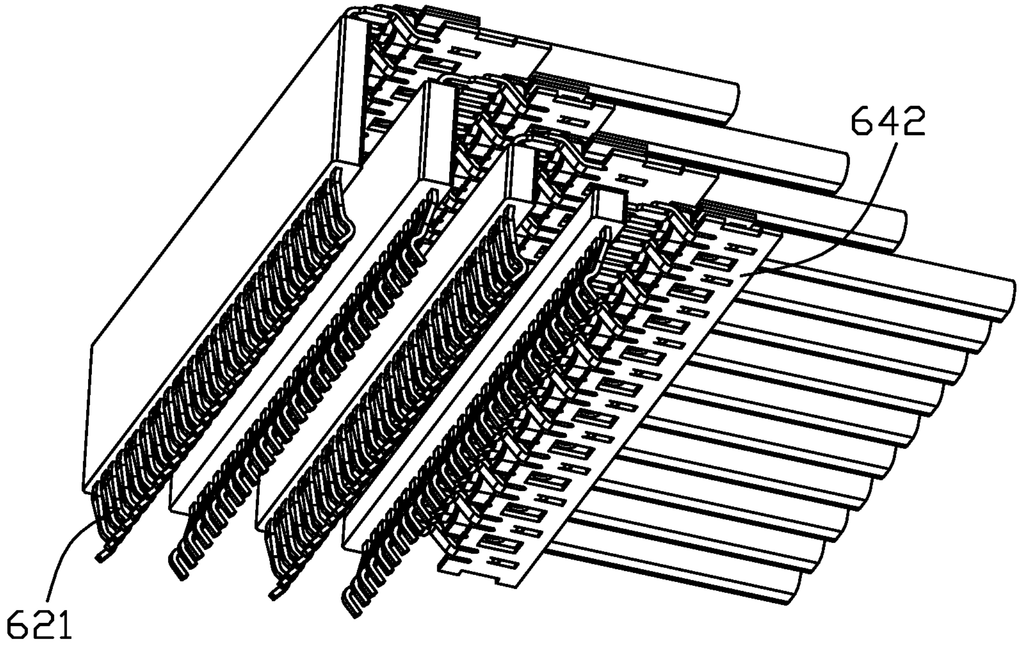
FIG. 13 is another perspective view of terminal modules and cables in FIG. 12.

Referring to FIGS. 11-13, the cable connector 200 includes an insulating base 50, a plurality of elastic terminals 62 and a plurality of cables 63 connecting with the elastic terminals 62. The insulating base 50 defines a mating portion 51 and two mating slots 52 in a longitudinal shape opening through the mating portion 51, each mating slot 52 is located with two rows of the elastic terminals 62 at opposite sides of the mating slot 52. A positioning board 53 is located at one side of the mating portion 51 near the cables 63 and defines two key recesses 531 at an inner side of the positioning board 53 facing the mating portion 51. A locking hole 54 is defined on opposite ends of the insulating base 50. As shown in FIGS. 5-6, one long plate 32 defines two projecting bars 321, the projecting bars 321 are received in the key recesses 531 for positioning and guiding function during a mating assembly of the two connectors. Another long plate 32 defines no protruding bars. The two long plates define longitudinal ribs 322 thereon. Each of the two short plates 31 defines a locking arm 311, the locking arms 311 are locked with the locking holes 54. The short plates 31 extend upward beyond the long plates 32 and define slanting guiding portion 312 above the locking arms 311. The long wall 12 defines two bosses 121 opposite to the projecting bars at an inside thereof, another long wall defines no bosses.

An insulating cover 59 is attached to the insulating base 50 to protect the terminals 62 and the cables 63. The insulating base 50 defines two through slots 551 connecting with each mating slot 52, and four supporting steps 552 are formed at opposite side to the mating slots 52. Each row of the elastic terminals 62 are injecting molded with an insulator 61 to form a terminal module, with elastic arms 621 and leg portions 622 are exposed to an exterior of the insulator 61. The terminal modules are inserted into the insulating base 50 through four through slots 551, and the leg portion 622 seat on the supporting step 552. The supporting steps 552 are provided with partitioning ribs to position the leg portions 622.

Figure 14:
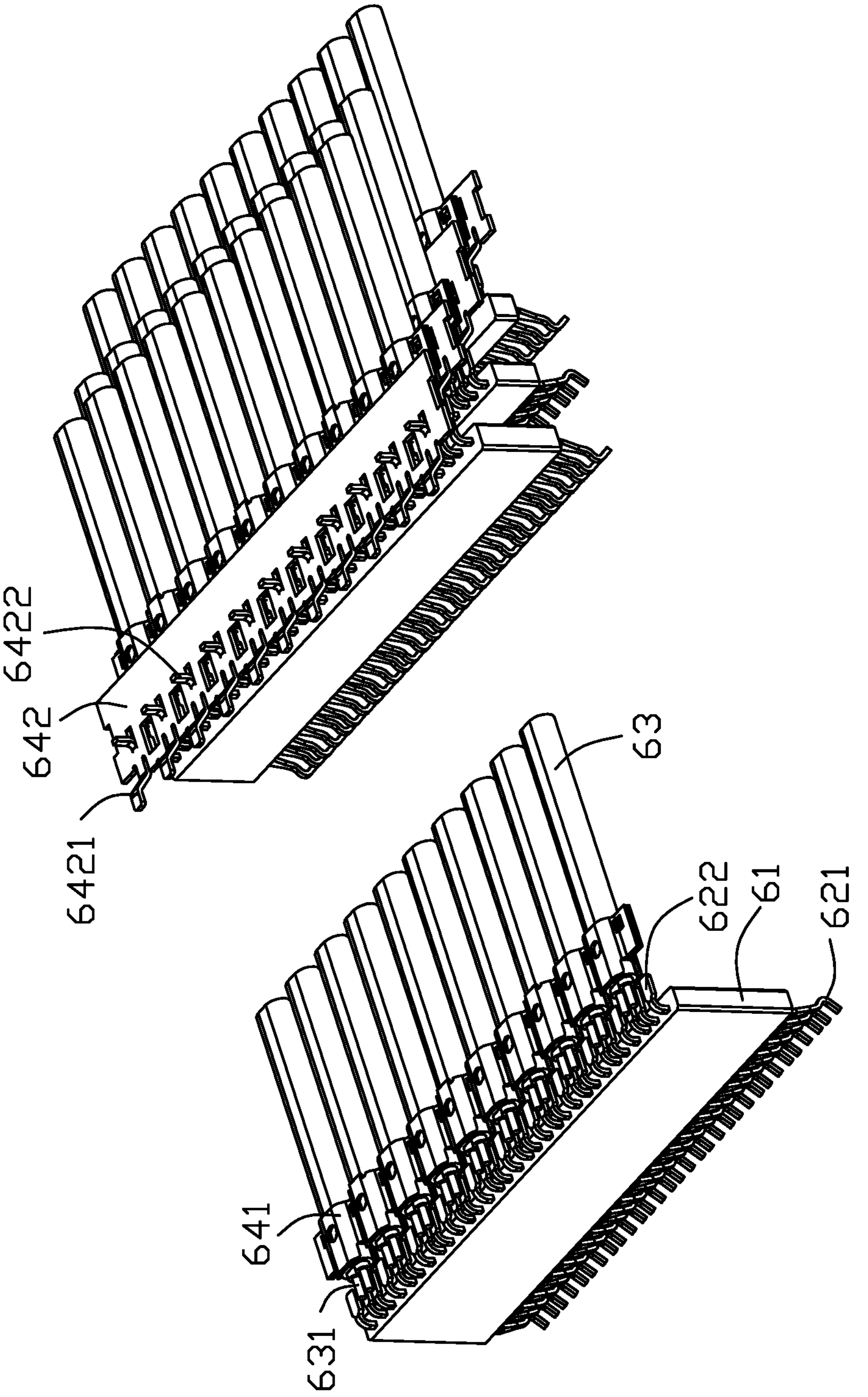
FIG. 14 is a further exploded perspective view of terminal modules and cables FIG. 13.

As best shown in FIG. 14, two conductive cores 631 of each cable 63 are soldering with the leg portions 622 of each pair of differential signal terminals, two shielding braces 641 embrace the upper halves and lower halves of the cables but behind the exposed conductive cores. The shielding braces 641 surround shielding layers of the cables, not insulating layer of the cables. A shielding plate 642 is located between every two rows of the cables. The shielding plate 642 extends plural grounding fingers 6421 to touch the soldering legs of the grounding terminals, and upright tabs 6422 inserted in the holes defined on the shielding braces 641.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. A cable connector comprising:

an insulting base comprising a mating portion and two longitudinal mating slots running through the mating portion;

four rows of elastic terminals retained in the insulating base, each mating slot being arranged with two rows of elastic terminals along two opposite sides thereof, the elastic terminal comprising an elastic arm protruding into the mating slot and a leg portion; and four rows of cables connecting with the leg portions of corresponding elastic terminals; wherein the insulating base defines two through slots connecting with each mating slot and four supporting steps at opposite sides to the mating slots, each row of elastic terminals are retained in an insulator, the insulators are inserted through corresponding through slots, and the leg portions seat on the supporting steps.

2. The cable connector as claimed in claim 1, wherein the mating portion defines a locking hole at opposite short ends thereof.

3. The cable connector as claimed in claim 2, wherein the insulating base comprises a positioning board located at a long side thereof and proximate to the cables, and the positioning board defines a key recess facing the mating portion.

4. The cable connector as claimed in claim 1, further comprising two shielding braces embracing upper halves and lower halves of the cables but behind exposed conductive cores of the cables.

5. The cable connector as claimed in claim 4, further comprising a shielding plate located between every two rows of cables, wherein the shielding plate has plural grounding fingers to touch the leg portions of grounding terminals of each row of elastic terminals and plural upright tabs inserted in holes defined on the shielding braces.

6. A board connector comprising:

an insulating housing comprising a bottom and two long walls extending upward from the bottom;

a metal shell comprising two long plates and two short plates fitly surrounding the long walls to define a mating cavity among the long walls and the short plates; and two mating tongues protruding into the mating cavity and being parallel to the long walls, wherein each of the two mating tongues is loaded with two rows of stationary terminals along two opposite sides thereof; wherein each row of terminals comprises a plurality of grounding terminals and a plurality of signal terminals, every two adjacent grounding terminals are bridged with a single grounding bar and constructed as a coupling grounding pair, adjacent coupling grounding pairs are separated from each other with no single grounding bar connecting with each other.

7. The board connector as claimed in claim 6, wherein one long plate defines two projecting bars at an outside thereof while another long plate defines no projecting bars, and one long wall defines two bosses at an inside thereof while another long wall defines no bosses.

8. The board connector as claimed in claim 7, wherein each of the two short plates defines a locking arm punched therefrom and slanting upwards and inwards.

9. The board connector as claimed in claim 8, wherein each of the two short plates defines a guiding portion extending upwards and inwards.

10. The board connector as claimed in claim 6, wherein the two rows of stationary terminals of each of the two mating tongues are retained in an insulator, the insulator comprises a base and a tongue, the stationary terminals comprise plate portions exposed upon the tongue and leg portions extending out of the base, the bases of the two insulators are retained in two slots defined on the bottom of the insulating housing, and the two tongues protrude into the mating cavity to form the two mating tongues.

11. The board connector as claimed in claim 6, wherein the grounding bars located on one row of the two rows of terminals face the signal terminals of another row of the two rows of terminals.

12. A cable connector comprising:

an insulting base comprising a mating portion and two longitudinal mating slots running through the mating portion;

four rows of elastic terminals retained in the insulating base, each mating slot being arranged with two rows of elastic terminals along two opposite sides thereof, the elastic terminal comprising an elastic arm protruding into the mating slot and a leg portion;

four rows of cables connecting with the leg portions of corresponding elastic terminals;

two shielding braces embracing upper halves and lower halves of the cables but behind exposed conductive cores of the cables; and a shielding plate located between every two rows of cables, wherein the shielding plate has plural grounding fingers to touch the leg portions of grounding terminals of each row of elastic terminals and plural upright tabs inserted in holes defined on the shielding braces.

* * * * *